United States Patent [19]

Goettker

[11] Patent Number: 5,013,059
[45] Date of Patent: May 7, 1991

[54] ACTUATOR/COUPLER

[76] Inventor: Bernhardt P. Goettker, 1031 Gale St., Escondido, Calif. 92027

[21] Appl. No.: 532,662

[22] Filed: Jun. 4, 1990

[51] Int. Cl.$^5$ .............................................. B60T 13/08
[52] U.S. Cl. ............................ 280/446.1; 188/112 R
[58] Field of Search ............ 280/428, 427, 432, 446.1, 280/455.1, 456.1, 460.1, 482, 506; 188/112, 122 A

[56] References Cited

U.S. PATENT DOCUMENTS

| | | | |
|---|---|---|---|
| 2,815,778 | 12/1957 | Holman . | |
| 3,180,455 | 4/1965 | De Puydr | 188/112 |
| 3,241,639 | 3/1966 | De Puydt . | |
| 3,734,540 | 5/1973 | Theirmann | 280/482 |
| 4,239,252 | 12/1980 | Huetsch | 280/512 |

*Primary Examiner*—Charles A. Marmor
*Assistant Examiner*—Victor E. Johnson
*Attorney, Agent, or Firm*—Duane C. Bowen

[57] ABSTRACT

An actuator/coupler having concealed rollers between forward coupler attaching to the towing vehicle and rear housing connected to trailer. Forward rollers bear on the underside of the top wall of the rear housing. The rear rollers bear on the underside of the top wall of the coupler. A hydraulic cylinder block is counterbored and the rear rollers have annular extensions fitting into the counterbores for roller support during assembly. Rests are provided under front rollers for roller support during assembly. A piston rod in the hydraulic cylinder extending forwardly through a pivotal latching wall having a clutching opening normally only letting the piston rod move rearwardly and locking against forward movement and a spring pressing the latching wall to locking position. A cable to connect to the towing vehicle and reeved in said coupler to pull said piston rod rearwardly to apply hydraulic pressure to trailer brakes in case of trailer disconnect, braking being maintained by means of the latching wall, the latching wall being releasable by manual pressure acting against the force of the spring. A hydraulic reservoir above the hydraulic cylinder and a diaphragm top for the reservoir and a plate over the diaphragm. An opening in the plate and diaphragm for hydraulic fluid refilling. Overlying walls of housing and coupler having matching openings, the opening in the housing being circular and an operating disc rotating mounted therein, the opening in the coupler having a forward pointed v-shape, a latch pivotally mounted in the disc to engage the v-shape of the coupler opening when depressed so that the coupler and housing are restrained from telescoping to apply braking pressure when backing, the latch automatically releasing when the vehicle moves forwardly relative to the trailer.

5 Claims, 8 Drawing Sheets

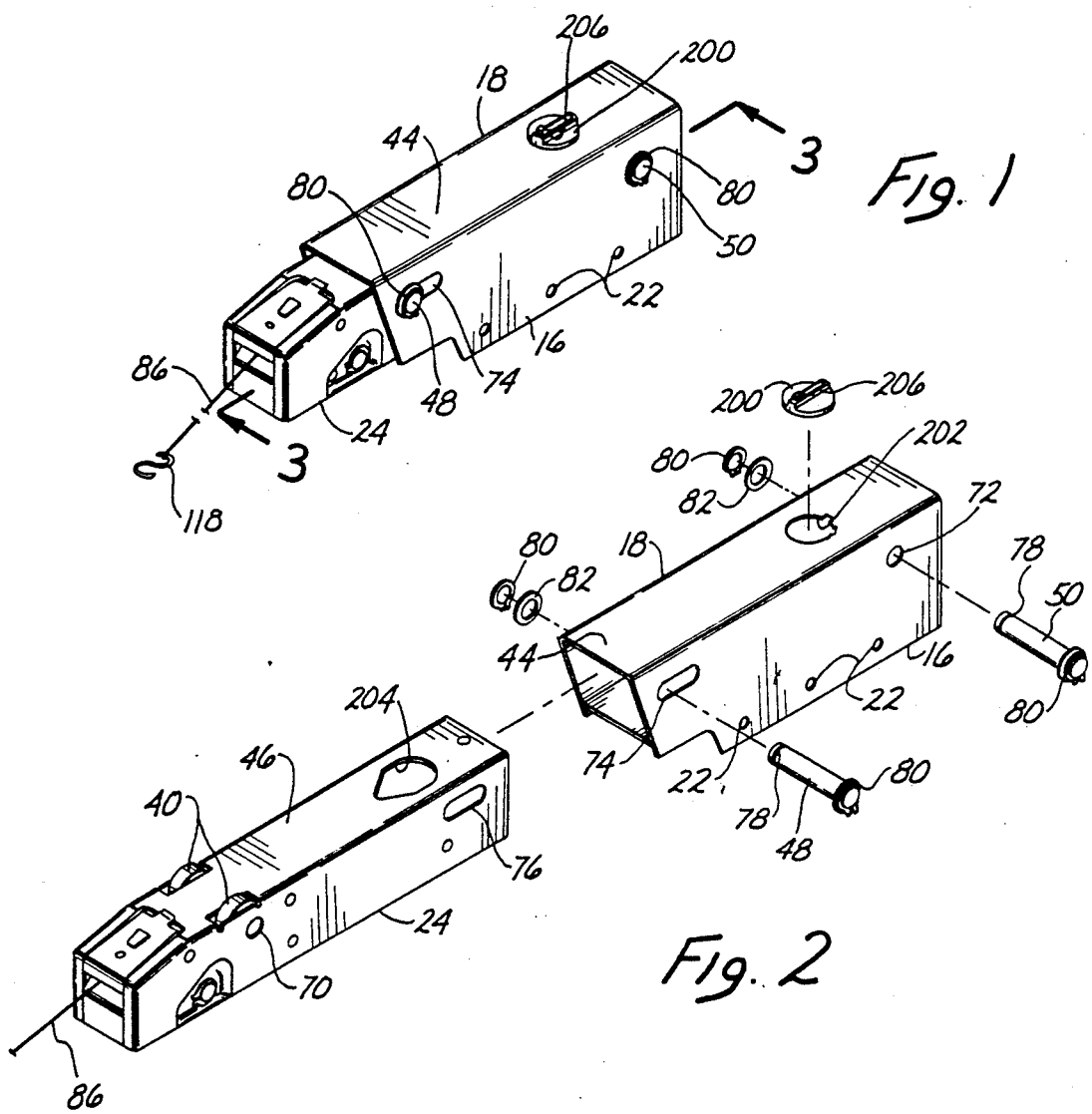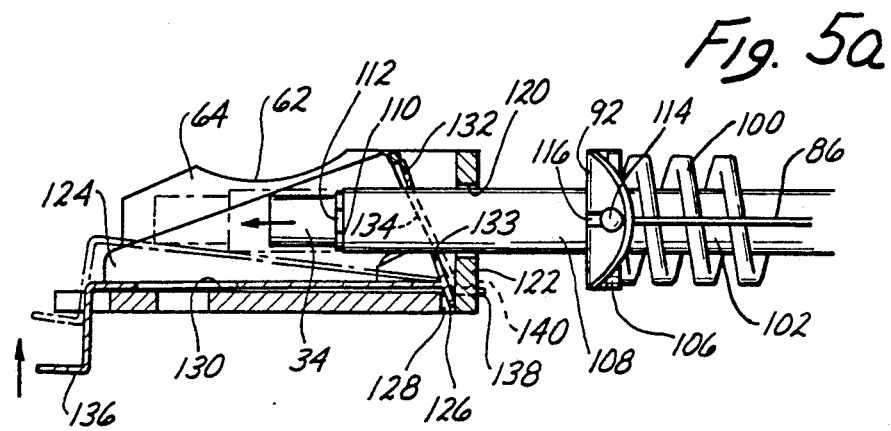

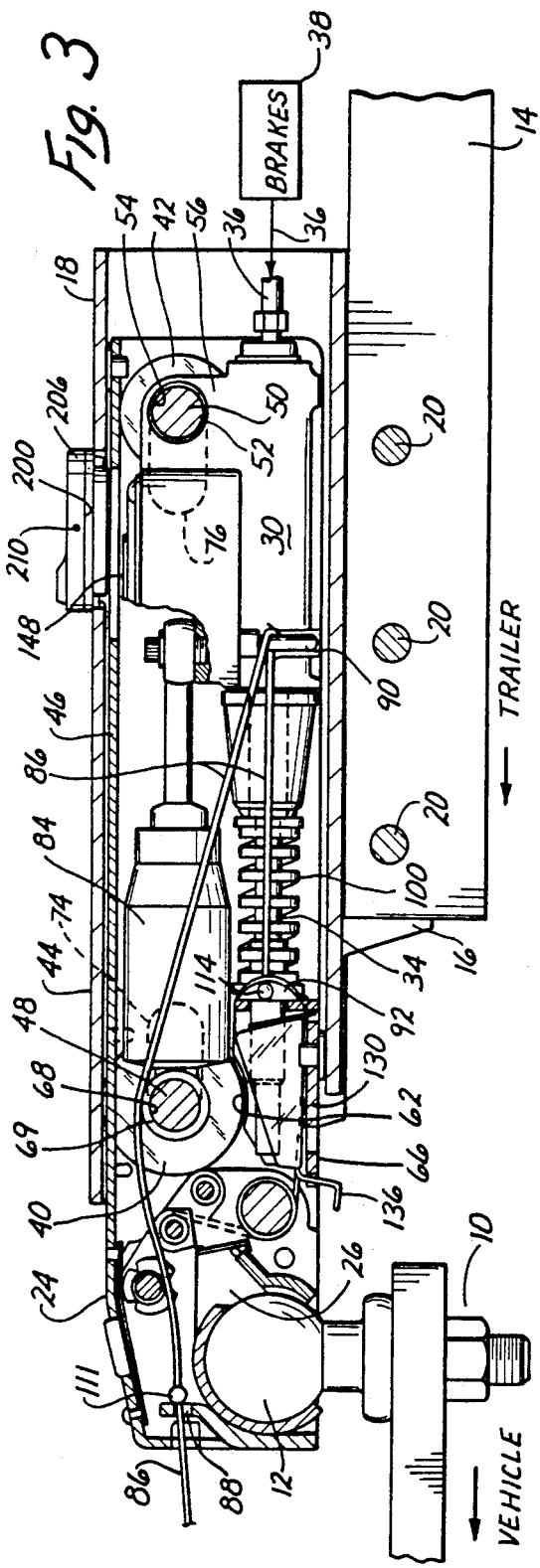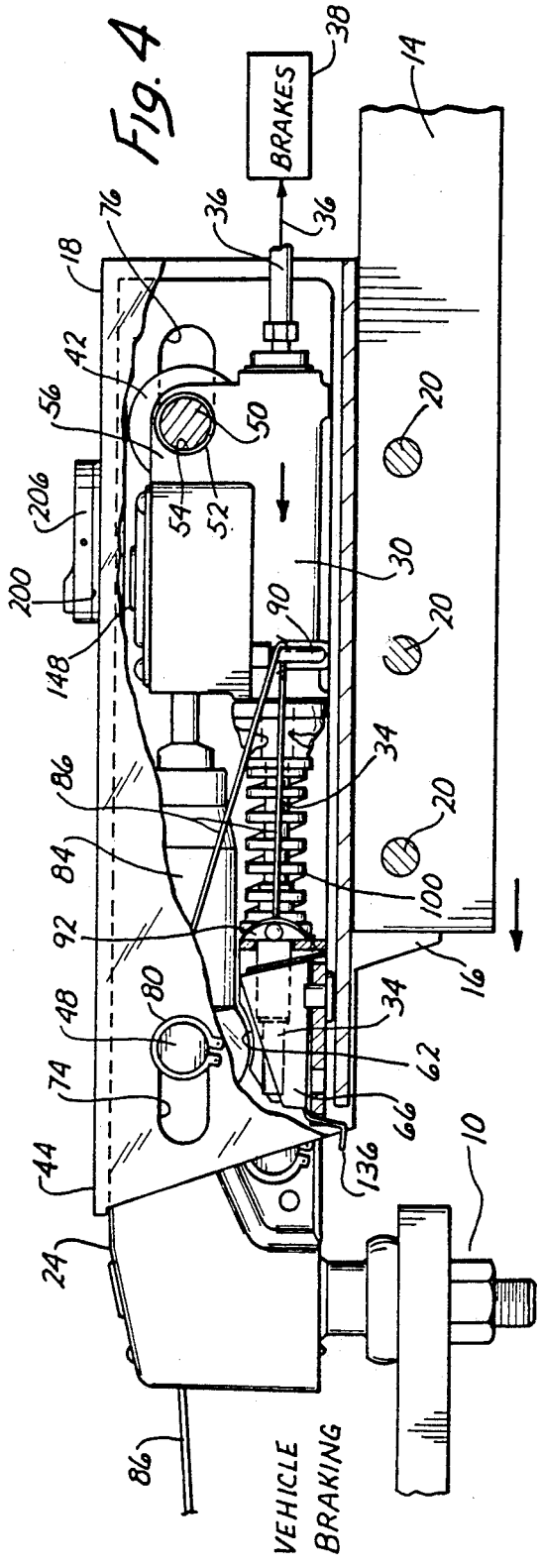

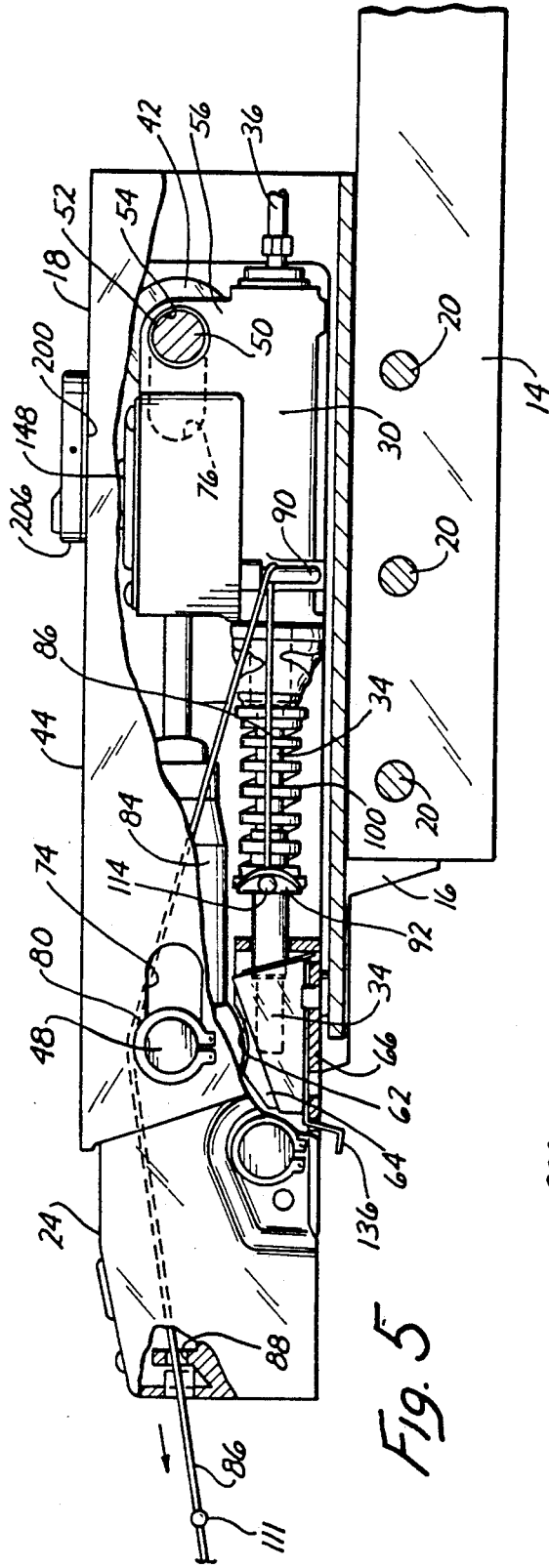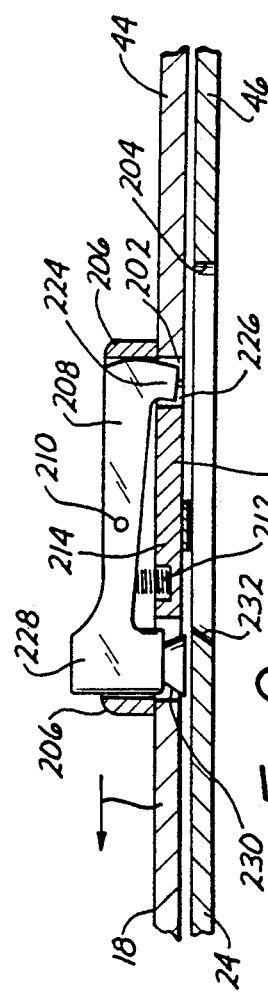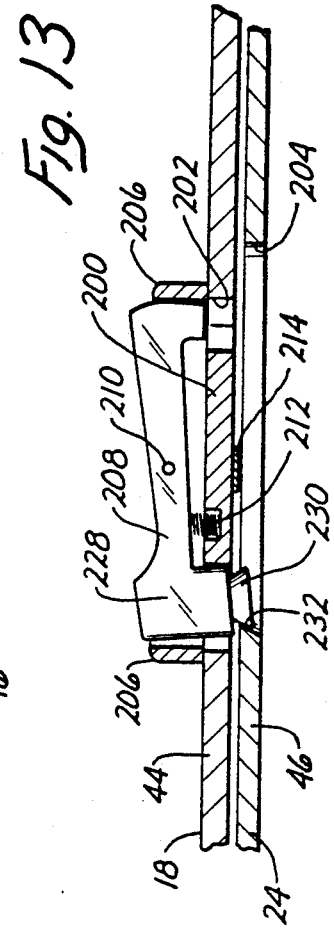

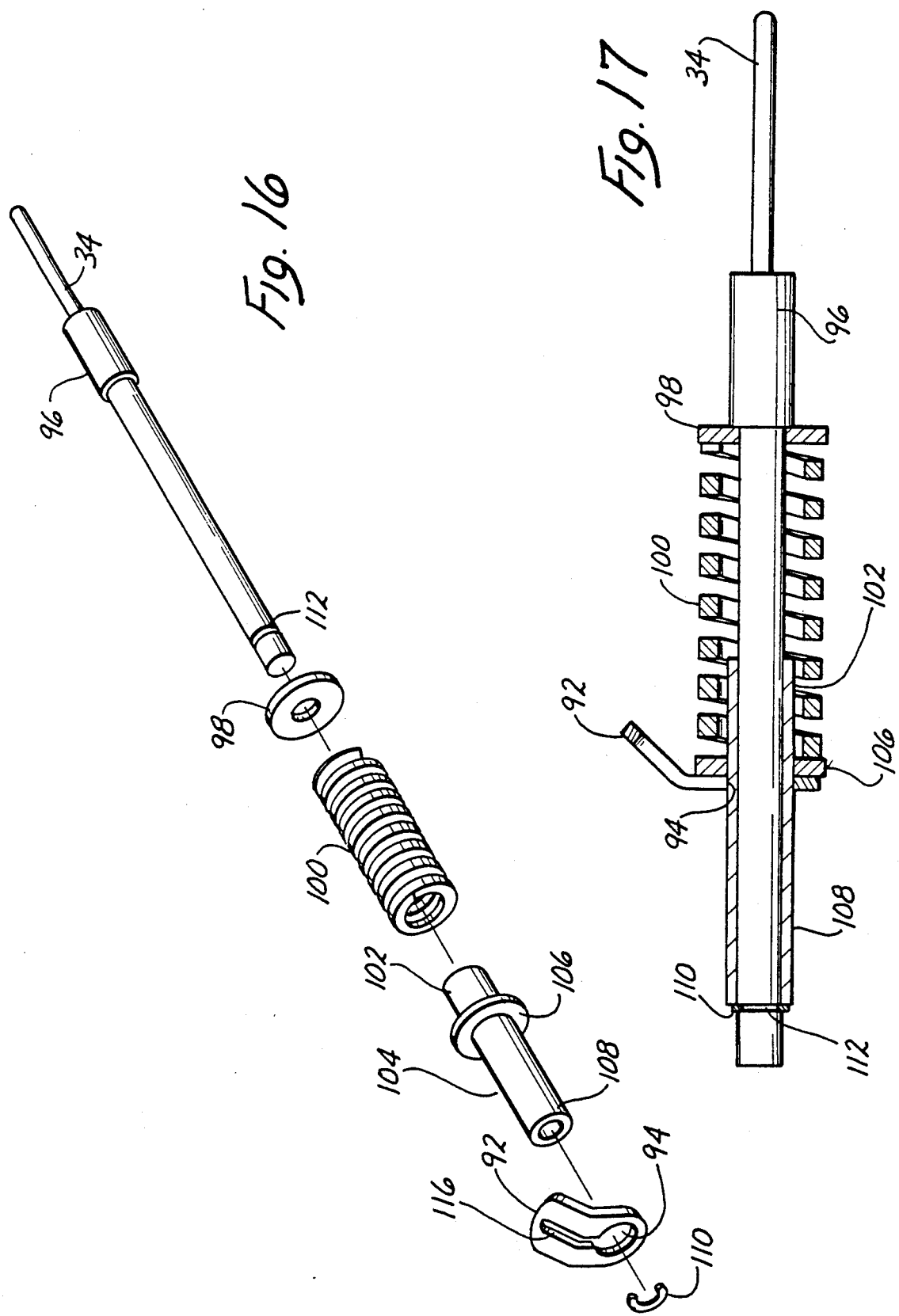

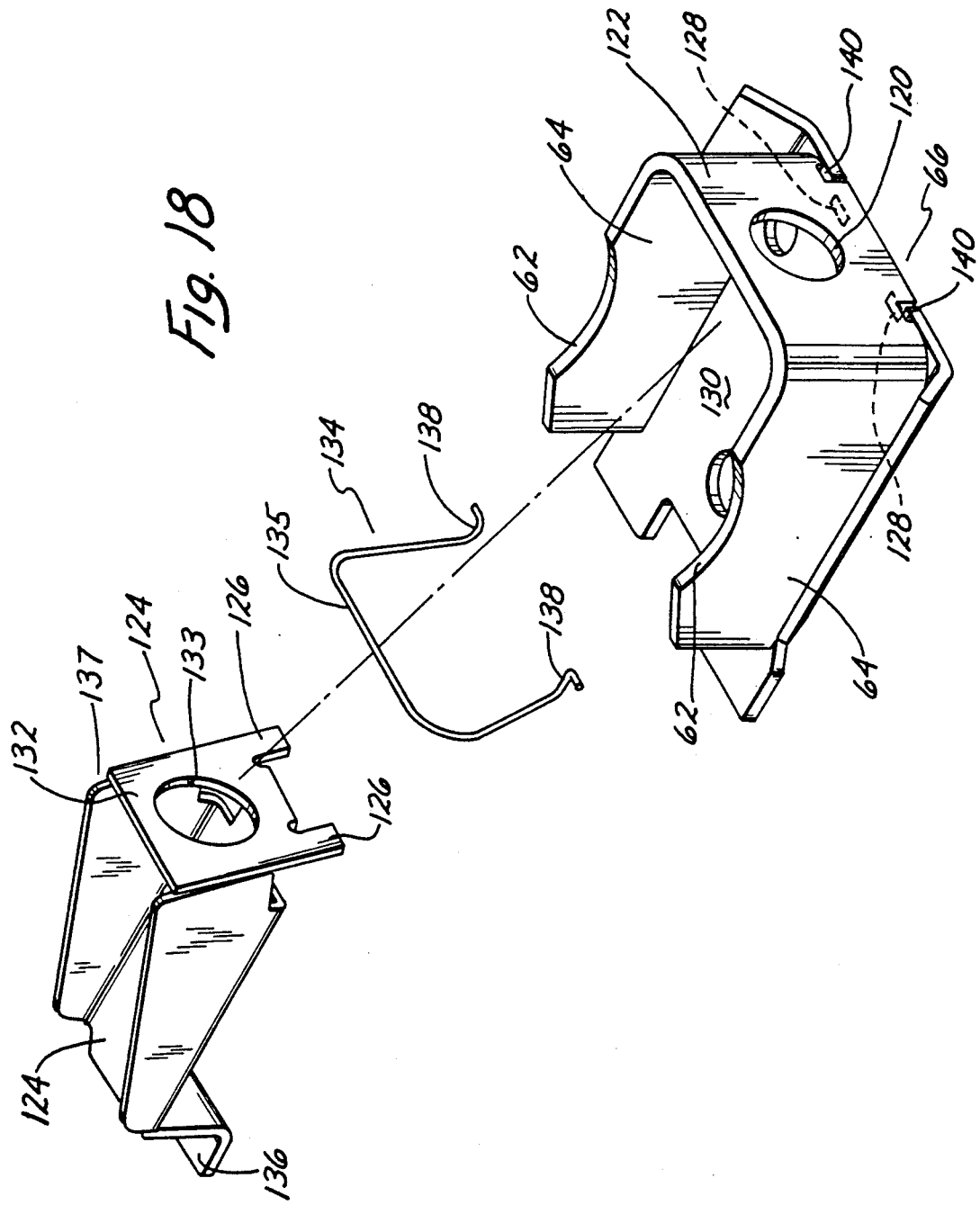

ACTUATOR/COUPLER

BRIEF SUMMARY OF THE INVENTION

BACKGROUND AND OBJECTIVE

My invention relates to improvements in an actuator/coupler that couples a towing vehicle to a trailer and that acts to set the hydraulic brakes of the trailer responsive to braking of the towing vehicle.

I have been working on couplers and actuators over a period of years and have conceived of features that would be desirable to have in an actuator/coupler including the following:

1. Concealment of two pairs of rollers in a right-rectangular housing involving telescoping parts consisting of a coupler attached to the ball hitch of the towing vehicle and the housing attached to the tongue of the trailer. Among other advantages, concealment of the rollers would help protect them from the trailer environment (dust, dirt, debris) and from the elements (rain, ice). Also, concealment would improve the appearance of the actuator/coupler. Having a flat, unobstructed surface on the top of the actuator/coupler makes this surface useful as a step in getting into or out of the trailer or a boat supported by the trailer. Essentially the same rear housing can be used to bolt or weld to various trailer tongue arrangements, i.e., either a straight tongue or an A-frame mounting.

2. I have found that concealment of the rollers involves certain problems in practical manufacturing, installation and maintenance, especially in orienting the rollers before their supporting shafts are inserted in the mechanism, so special provisions need to be made for such roller orientation.

3. It is desirable to be able to pull out the coupler from the rear housing as one piece, for improved access in maintenance, repair or replacement. This would facilitate a factory repair or replacement program if desired. The rear housing most likely will be secured to a trailer tongue by bolts or welding. It is desired that the coupler, and the hydraulics, shock absorber, latching mechanism, etc., attached thereto will come free when the front and rear shafts are pulled. These shafts will support front and rear rollers. The only operation needed to pull the coupler, other than pulling the shafts, is detachment of the hydraulic line to the trailer brakes.

4. The reservoir function for the actuator hydraulic cylinder should be adapted for easy inspection of fluid level and for addition of hydraulic fluid as needed, yet the fluid in the reservoir should be protected from the atmosphere with a diaphragm which adapts to various levels of hydraulic fluid. At the same time, the diaphragm construction needs to be economical and commensurate with other actuator/coupler manufacturing costs. The actuator/coupler may be submerged in a lake or other water in launching a boat from a trailer, and hence the diaphragm protects hydraulic fluid when the reservoir is submerged.

5. A practical, reliable, economical system needs to be provided to set and hold the brakes of the trailer in case of accidental trailer uncoupling from the towing vehicle.

6. The usual actuator function involves a telescoping hydraulic piston and cylinder pumping hydraulic fluid to the brakes when the towing vehicle slows and the trailer tends to overrun the towing vehicle. A difficulty with this system arises when the towing vehicle is used to back the trailer and considerable force is required, such as in backing upgrade or over a soft, resistive roadway. An easily operated subsystem needs to be provided to deactivate the normal trailer braking system during backing. This subsystem should be automatically deactivated when the towing vehicle goes forward again, so as to avoid the circumstance that the driver forgets to manually deactivate the subsystem when the backing situation is over. This feature can be provided as an optional addition to an actuator/coupler without the subsystem, so that a purchaser can buy a less expensive actuator/coupler without this feature if he desires.

The objectives of my invention include to provide an actuator/coupler with the features 1,2,3,4,5 and 6 above and to provide an actuator/coupler with other desirable features and characteristics including providing first class quality of construction and including a shape matching common trailer construction from right-rectangular structural members.

My invention will be best understood, together with additional objectives and advantages thereof, from the following description, read with reference to the drawings, in which:

THE DRAWINGS

FIG. 1 is a perspective view of a specific embodiment of my new actuator/coupler.

FIG. 2 is a perspective view in which some of the parts are in exploded positions.

FIG. 3 is an enlarged view taken partly in section as indicated by line 3—3 of FIG. 1. The coupler attached to the ball hitch of the towing vehicle and the rear housing attaching to the trailer tongue are in expanded towing positions, as indicated by the arrows and legends in the view.

FIG. 4 is like FIG. 3 except the vehicle is being braked, as indicated by an arrow and legends in the view, whereby the coupler and the housing are in contracted positions.

FIG. 5 is a side view, partly in section and partly broken away, illustrating especially the cable actuated system for setting and holding trailer brakes in case of accidental disconnection of the coupler from the ball hitch of the towing vehicle.

FIG. 5a is an enlarged side view, partly in section, showing parts of the system illustrated in FIG. 5.

FIG. 9 is a view partly in section taken on line 9—9 of FIG. 10.

FIG. 13 is a view partly in section taken on lines 13—13 of FIG. 12.

FIG. 16 is a perspective view of the piston rod assembly in exploded form.

FIG. 17 is a side view of the piston rod assembly, partly in section.

FIG. 18 is an exploded perspective view of parts of the piston rod clamping mechanism.

SPECIFIC DESCRIPTION

Figure 6:
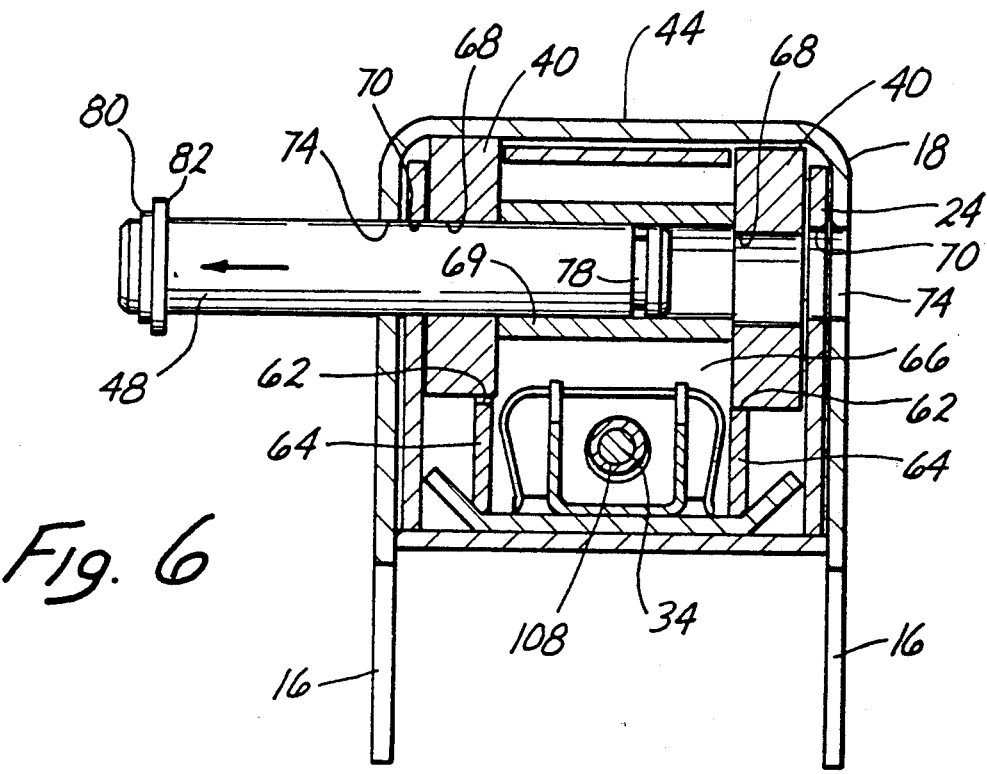
FIG. 6 is a view partly in section showing the area of the front rollers of the assembly. The roller-supporting front shaft is in the process of being removed.
Figure 7:
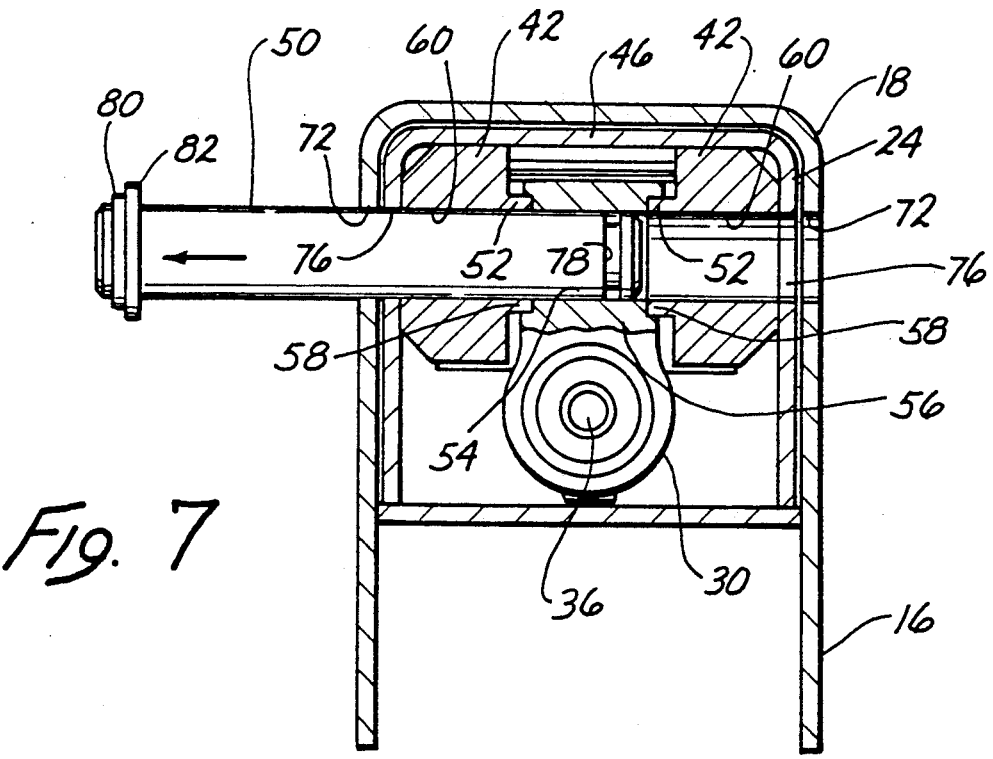
FIG. 7 is like FIG. 6 except the area of the rear rollers is being viewed.

The actuator/coupler partly follows conventional details familiar to those skilled in the art or matters not involved with this particular invention, so the following description will not deal needlessly with such conventional or irrelevant details.

The towing vehicle is represented by the trailer hitch 10 and the ball 12 that are shown in FIGS. 3 and 4. The trailer tongue 14 is secured to flanges 16 depending from a rear housing 18 by bolts 20 extending through openings 22 in flanges 16. The trailer tongue 14 can be secured to rear housing 18 by other means than bolts if desired. A coupler 24 is secured to ball 12 of hitch 10 by a manually secured and released jaw mechanism 26 that will not be described in detail because the jaw mechanism does not form a part of the invention being described herein.

Coupler 24 and rear housing 18 are generally right-rectangular. Coupler 24 fits telescopically within housing 18 and coupler 24 and housing 18 contract as shown in FIG. 4 responsive to vehicle braking so that the trailer tends to over run the vehicle (as indicated by the arrow and the legends), whereas in normal towing coupler 24 and housing 18 tend to expand as the vehicle pulls the trailer against the resistance to towing of the vehicle caused by road friction and air resistance acting on the trailer. A hydraulic cylinder 30, piston 32, and piston rod 34 are connected to the actuator/coupler in a manner to contract and apply hydraulic fluid pressure through line 36 to brakes 38 responsive to contraction of the actuator/coupler (during deacceleration or braking of the vehicle) and in a manner to expand and take away hydraulic fluid pressure from brakes 38 responsive to expansion of the actuator/coupler (during ordinary travel or acceleration of the vehicle).

Coupler 24 makes a loose fit within housing 18. Vertical antifrictional contact and guidance between coupler 24 and housing 18 are provided by a pair of juxtaposed front rollers 40 and a pair of juxtaposed rear rollers 42. Front rollers 40 bear on the under surface of the top wall 44 of housing 18 and rear rollers 42 bear on the under surface of the top wall 46 of coupler 24. I consider this arrangement to be highly desirable in that (a) the rollers are covered so as not to be directly exposed to road dust, sand, gravel, debris, salt, grime, etc., or to weather, i.e., rain, snow, ice, etc., and (b) the rollers are concealed so that the actuator/coupler makes a cleaner more attractive appearance in that these components are housed in smooth, sleek, right-rectangular housings.

The use of protected, concealed rollers, however, makes a problem in installation, which is one reason I hesitated with the concept of concealed rollers within right-rectangular coupler and rear housing members. The problem is to orient the rollers 40, 42 while the supporting front and rear shafts 48, 50 are being installed. Not only are means needed to solve this problem but also the solution should not involve undue expense.

In the case of rear rollers 42, my solution to orienting the rollers prior to installation of rear shaft 50 is to provide counterbores 52 to the bore 54 through the hydraulic cylinder block 56 and to provide annular extensions 58 to rear rollers 42 to fit into counterbores 52. In this way, rear rollers 42 are oriented in place by counterbores 52 as coupler 24 is inserted into rear housing 18 until rear shaft 50 is positioned in openings 60 in rear rollers 42. Coupler 24 contains hydraulic cylinder block 56.

In the case of front rollers 40, my solution to orienting the rollers prior to installation of front shaft 48 is to provide a pair of rests 62, one under each roller. Rests 62 are preferably upwardly concave and have the shapes of arcs of circles when viewed from the sides thereof. Rests 62 are formed in walls 64 at the sides of a piston rod clamping member 66 later to be described. Walls 64 are in the planes of front rollers 40. In this way, front rollers 40 are oriented in place by rests 62, as coupler 24 is inserted into rear housing 18, until front shaft 48 is inserted through the openings 68 in front rollers 40. Note that front rollers 40 are spaced by a bushing or eye ring 69 attached to shock absorber 84.

Front shaft 48 is secured in openings 70 in coupler 24 and rear shaft 50 is secured in openings 72 in rear housing 18. Front shaft 48 extends through slots 74 in rear housing 18 and rear shaft 50 extends through slots 76 in coupler 24 which limit the relative telescoping movement of coupler 24 in housing 18.

Shafts 48, 50 are shown as having end grooves 78 and snap rings 80 securing the shafts in place. Washers 82 are also employed. An hydraulic, self contained shock absorber 84 between front shaft 48 and hydraulic block 56 also is illustrated but doesn't form a part of the invention.

I will next describe my system to apply brakes on the trailer should the trailer become uncoupled from the towing vehicle on the road. A breakaway cable 86 is received in coupler 24 through front opening 88 in coupler 24, over front shaft 48, and over rod 90 attached to block 56 (where cable 86 makes a return bend) and attaching to a cable attachment or traveler clip 92. Clip 92 has an opening 94 slidably receiving the piston rod assembly. The piston rod assembly includes the piston rod per se 34, an enlarged rod piston 96, a washer 98 abutting enlarged rod portion 96, and a heavy duty compression spring 100. Spring 100 encircles rod 34 and one end portion 102 of spool 104. Spool 104 has an annular flange abutment 106 abutting spring 100. A second end portion 108 of spool 104 is provided. Cable attachment clip 92 is mounted on second end portion 108 abutting annular abutment 106. A snap ring 110 fits in a groove 112 in piston rod 34 and restrains spool 104 in movement in that direction. Ball 111 on the forward end portion of cable 86 indicates that the brakes 38 have not been set by cable 86 if ball 111 is positioned adjacent to opening 88.

One end of cable 86 is attached to clip 92 by means of a ball stop 114 on the cable and a keyhole slot 116 in clip 92. The other end of cable 86 has a hook 118 securing to the towing vehicle, i.e., through an opening in hitch 10 not shown. If the trailer becomes disconnected on the road from the towing vehicle, enough force is applied by cable 86 to set the brakes of the trailer before hook 118 is bent open or breaks.

Spool end portion 108 extends through a guide opening 120 in an end wall 122 of piston rod clamping member 66. Clamping member 66 is appropriately secured to coupler 24, as by welding. A pivotal latch member 124 is installed in clamping member 66. The pivot for member 124 is formed by downturned feet 126 disposed in openings 128 in the bottom plate 130 of clamping member 66. Pivotal member 124 has a latching end wall 132 normally disposed in an oblique plane. Latching wall is pressed by spring 134 to a latching position in which the walls of an opening 133 therein grasps spool end portion 108 to latch or clutch end portion 108 and to restrain end portion 108 (and piston rod 34) from moving forwardly in coupler 24. Pivotal latch member 124 can be pivoted toward a position more nearly normal to the axis of piston rod 34 to release spool end portion 108 by manual upward force applied to a foot 136 formed at the end of pivotal latch member 124 away from the pivot and exposed below the bottom of coupler 24. Spring 134 has a U-shape and has ends 138 secured in openings 140 in clamping member 66. The middle portion 135 of spring 134 is received by a rest 137 at the top of latching end wall 132 of pivotal latch member 124.

Spool 104 is normally stationary relative to coupler 24 during braking operations. Hydraulic cylinder 30 moves with rear housing 18 relative to coupler 24 whereby piston 32 and cylinder 30 have relative motion applying pressure of hydraulic fluid through line 36 to brakes 38. However, when coupler 24 breaks away from the towing vehicle, breakaway cable 86 is pulled resulting in the cable pulling cable attachment clip 92 rearwardly against spool abutment 106 thereby compressing spring 100 and moving spool end portion 108 relative to opening 133 in latching end wall 132 of pivotal latch 124. This results in piston rod 34 moving piston 32 in cylinder 30 to apply braking pressure to brakes 38 thereby braking the trailer. Latch 124 will hold spool end portion 108 and piston rod 34 in braking position until pivotal latch 124 is pivoted to a more nearly normal position relative to piston rod 34 by manual upward pressure on foot 136. Whereupon piston rod 34 and spool 104 are returned to their usual positions and hydraulic pressure on brakes 38 will be relieved. Piston rod 34 is returned in this case by internal hydraulic braking pressure and by a compression spring (not shown) acting on the rear side of the piston within cylinder 30.

To review, I have provided means to set the brakes 38 on a trailer by force applied by a breakaway cable 86. Piston rod 34 is forced rearwardly by cable 86 thereby pressurizing hydraulic fluid in cylinder 30 and setting brakes 38. Opening 133 in latching end wall 132 of pivotal latch member 124 is used to clutch the piston rod assembly. Release of pivotal latch member is accomplished by upward manual pressure on foot 136.

Figure 14:
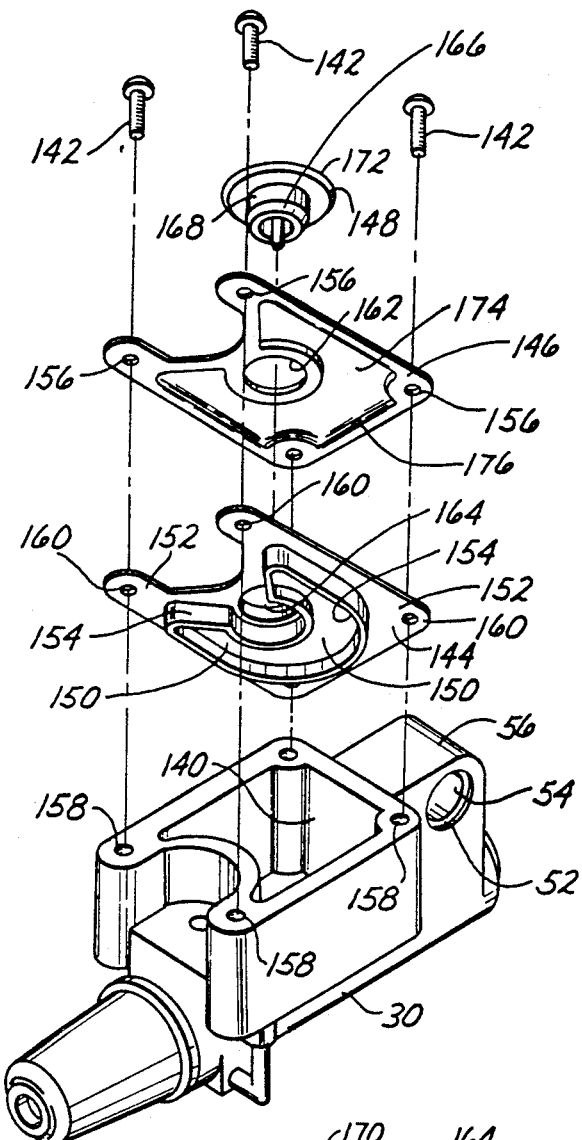
FIG. 14 is a perspective view of the hydraulic cylinder and reservoir area of the mechanism. Some parts are shown in exploded positions.
Figure 15:
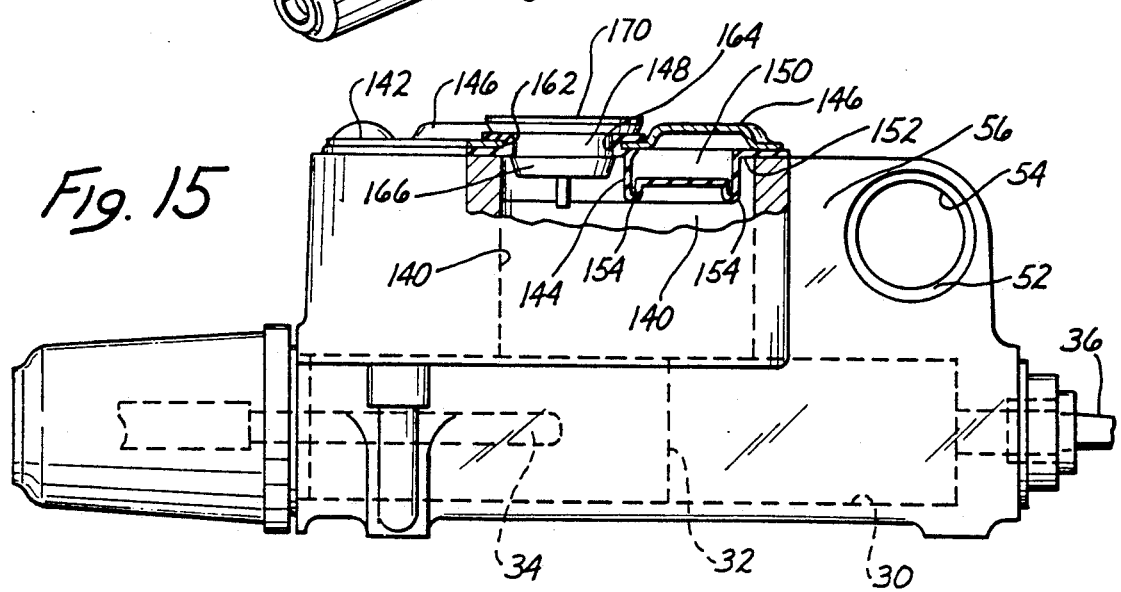
FIG. 15 is a side view of the cylinder and the reservoir area. Portions are broken away and shown in section.

I will next describe improvement involving the hydraulic reservoir 140. Attention is directed particularly to FIGS. 14 and 15. Reservoir 140 communicates with hydraulic cylinder 30 and replenishes hydraulic fluid to cylinder 30 during action of the piston/cylinder assembly and also compensates for any loss of fluid.

The cover or top to reservoir 140 has three components (plus screws 142): (a) a thin flexible diaphragm 144, (b) a rigid plate 146 and (c) a fill opening cap 148. Diaphragm 144 is made of rubber or other elastomeric material. Plate 146 is made of metal and is used to support diaphragm (to add rigidity to the cover). Cap 148 is preferably formed of a fairly rigid plastic.

Diaphragm 144 should be thin and flexible enough to readily belly down under atmospheric pressure as hydraulic fluid is removed from reservoir 140. The material of diaphragm 144 also can be somewhat elastic. As shown in FIG. 15, diaphragm 144 has a U-shaped medial portion 150 that is formed to depend from the edge portions 152 of diaphragm 144. The U-shaped portion 150 makes return bends 154 at its margins. This means that depending U-shaped medial portion 150 and the return bends 154 are disposed to readily ascend or descend responsive to negative or positive pressure in reservoir 140 to expand or contract the air space in reservoir 140 above the hydraulic fluid.

Metal cover plate 146 has generally the same shape as diaphragm 144 in plan view. It has corner openings 156 for screws 142 which fit in bores 158 in block 56. Diaphragm 144 also has corner openings 160 for screws 142. Plate 146 has a central fill opening 162. Diaphragm 144 also has a central fill opening 164 with walls making a return bend about the edges of plate opening 162. Fill opening cap 148 is press fit into diaphragm fill opening 164 to close reservoir 140 except when removed for refilling. The lower portion 166 of cap 148 is tapered to facilitate entry into diaphragm fill opening 164 and an upper portion 168 of cap 148 has parallel walls to seat in diaphragm fill opening 164. The top 170 of cap 148 has the form of a disc forming a top flange 172.

Plate 146 is shaped with upwardly displaced medial portions 174 that form an air space as well as strengthen plate 146 in the manner of ribs. There is a very small vent 176 to the atmosphere in plate 146 so that atmospheric pressure can be applied to the U-shaped medial portions 150 of diaphragm 144. This vent 176 can be a minor slit struck out from plate 146. The size of vent 176 is exaggerated in FIG. 14 in order for it to be seen. The edges of plate 146 seal the edge portions 152 of diaphragm 144 against the margins of reservoir 140.

Before my invention, the choice in hydraulic fluid reservoirs seemed to be (a) the cover and integral diaphragm that are completely removed (found in automobiles) and (b) the reservoir without diaphragms (that are found in actuators) in which the hydraulic fluid is subject to pollution and deterioration due to contact with contaminants, dust, moisture, etc., in the air. My solution has been to provide a diaphragm construction such as is found in automobiles but to provide a capped fill opening through the diaphragm so that minimum time and effort is required to check reservoir fluid level and to replenish the fluid as needed.

I will now describe the inventive features particularly shown in FIGS. 8 to 13. This is an optional system that can be installed upon actuator/coupler purchase or can be later added. If not originally purchased, openings 202, 204 are still present but opening 202 is fitted with a plug (not shown). A removable operating disc 200 is provided in the top wall 44 of housing 18. This fits in an opening 202 in housing 18 that is superposed to an opening 204 in coupler 24. Openings 202, 204 are superposed to hydraulic reservoir fill opening 164 and fill opening cap 148, so inspection of hydraulic fluid in reservoir 140, and replenishment of fluid, can be accomplished by removal of disc 200 and cap 148. Without this feature, design of access to fill opening 164 would be difficult.

The purpose of disc 200 and openings 202, 204 can be stated to be primarily for other purposes and only secondary for purpose of hydraulic reservoir access. The problem addressed is a need to disable the hydraulic piston and cylinder actuator functions when backing up a grade or in a high friction roadway wherein the force applied by the towing vehicle to coupler 24 would move piston 32 relative to cylinder 30 and set trailer brakes 38. If the trailer has more than minimum resistance to backing, the effect of backing on the actuator would be the same as braking of a vehicle in traveling wherein the trailer tends to run up on the vehicle which works the hydraulic piston/cylinder system to apply brakes 38.

Operation of disc 200 is by rotation and a raised diametrically oriented lug 206 provides a surface to be manually grasped in rotating disc 200. Centrally mounted in lug 206 is a pivotal latch 208 mounted to pivot about a pin 210 extending laterally, centrally on lug 206 and latch 208. A compression spring 212 between disc 200 and latch 208 normally biases latch 208 to the unlatched position shown in FIG. 9 in the plane of disc 200.

A retainer strip or clip 214 is secured to the bottom of disc 200 and has its ends 216, 218 normally disposed between the upper wall 44 of housing 18 and the upper wall 46 of coupler 24. This keeps disc 200 from being removed except in one clocked position when end 216 is in edge recess 220 in opening 202 and end 218 is in front arcuate edge recess 222 in opening 202. This position is not shown in FIGS. 8, 10, 11 and 12 but obviously will result in release of disc 200 for removal for access to hydraulic reservoir fill cap 148.

Normally disc 200 is held in inactive position with lug 206 and latch 208 aligned in a fore and aft direction (longitudinally of the actuator/coupler) by a boss 224 at the rear end of latch 208 fitting in recess 226 in the edge of opening 202, as shown in FIG. 9. When the front end of latch 208 is depressed pivoting the latch, boss 224 is removed from recess 226 and it is possible as viewed in FIG. 13 to rotate disc 200 to activate the backing latching system. Note in the FIG. 8 position the front end of latch 208 could be depressed into opening 204 in coupler 24 but in the FIG. 9 and FIG. 10 position that the front end of latch 208 could not be depressed because the underlying top wall 46 of coupler 24 would abut the front end of latch 208 and prevent it from downward movement. This is, because in the FIG. 10 portion the actuator is already in position retracting coupler 24 rearwardly relative to housing 18.

The front end of latch 208 has depending therefrom a boss 228 with a latching groove 230. This groove 230 is adapted to coact with the front portion 232 of opening 204 which is v-shaped in plan view and beveled in section (see FIGS. 9 and 13).

Figure 8:
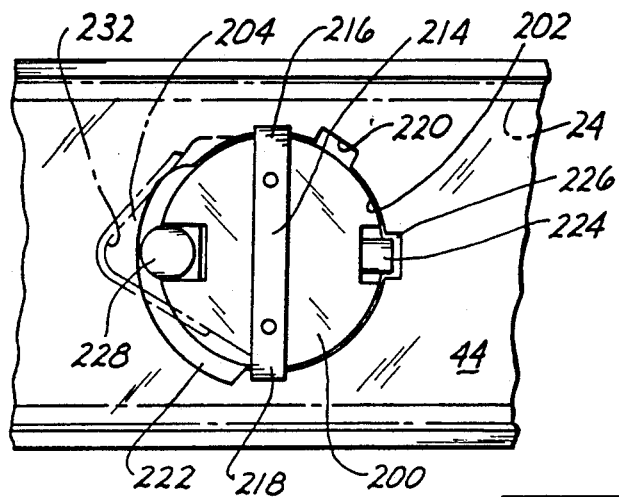
FIG. 8 is a view from the bottom of the rear housing. The orientation of the coupler and the walls of an opening in the coupler are indicated in dashed lines.
Figure 10:
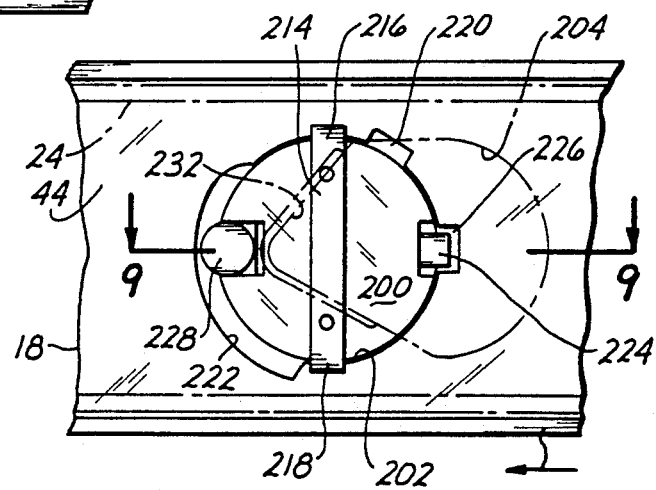
FIGS. 10, 11 and 12 are like FIG. 8 but show a sequence of positions of the parts that are being viewed in full and dashed lines.
Figure 11:
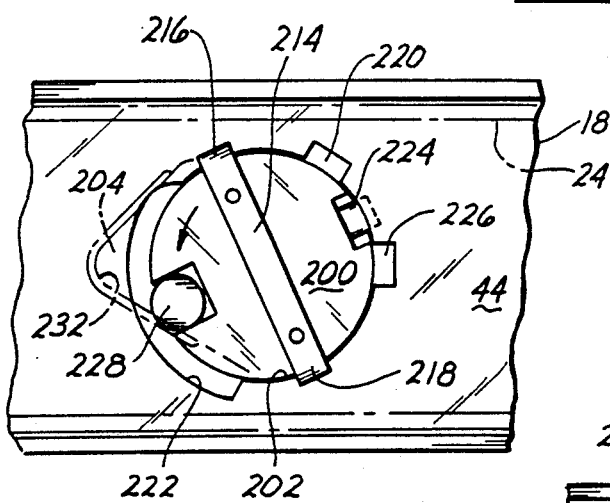
Figure 12:
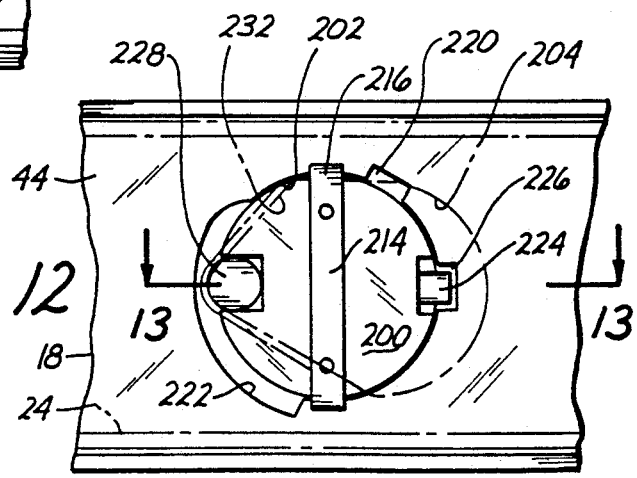

When the actuator/coupler is in the FIG. 8 position before backing begins, the front end of latch 208 can be manually depressed removing rear boss 224 from recess 226 and the disc 200 can be manually rotated clockwise to the FIG. 11 position in which groove 230 of front boss 228 engages the V-shaped front portion 232 of coupler opening 204 and tends to remain in this position because rear boss 224 is bearing on the top wall 44 of rear member 18. When backing is initiated, this force rotates disc 200 counterclockwise to the FIG. 12 position but groove 230 remains engaged with the V-shaped sharpened front portion 232 of opening 204 because the movement of the parts keeps the groove engaged with the sharpened V-shape portion 232 of opening 204 until it becomes wedged in the point of the V-shape as viewed in FIGS. 12 and 13. Note, however, that any forward vehicle movement will advance coupler 24 relative to housing 18 and will dislodge the sharpened V-section 232 from groove 230 and the spring 212 will pivot latch 208 back to inactive position. This means that the user can not accidentally forget to deactivate latch 208 and start down the road with the brake actuator system deactivated.

From the above description, it will be seen how the actuator braking function can be deactivated by manual depression of the front end 228 of latch 208 and by rotation of latch 208. When backing commences groove 230 engages with the V-shaped portion 232 of opening 204 to thereby prevent coupler 24 from moving rearwardly relative to housing 18 (FIG. 13). When the vehicle moves forwardly, however, groove 230 disengages from V-shaped portion 232 of opening 204 and latch 208 is snapped back to its inactive position.

Having thus described my invention, I do not wish to be understood as limiting myself to the exact details described, but instead wish to cover those modifications thereof that will occur to those skilled in this art upon examining my disclosure and which are properly within the scope of the following claims.

I claim:

1. An actuator/coupler for a trailer having a forward coupler to receive a ball of a towing vehicle and a rear housing to attach to a tongue of said trailer, said trailer having hydraulically actuated brakes, the improvement, comprising:

(a) said coupler having generally a right-rectangular exterior shape and said housing having a hollow interior of right-rectangular shape generally fitting the shape of said coupler which has a telescoping relationship thereto, said housing having an exterior of right-rectangular shape, (b) said coupler having a top wall with a pair of juxtaposed openings in a forward portion thereof and a first pair of juxtaposed rollers disposed in said openings and extending to a level above said top wall and said housing having an interior top wall and said rollers bearing on the underside of said interior top wall of said housing, said coupler having a pair of side openings and a first shaft supporting said rollers and extending laterally of said coupler and through said pair of side openings and said rollers being rotatably supported by said shaft, said housing having slots through which said first shaft extends which permit limited fore and aft movement of said shaft relative to said housing as said coupler telescopes relative to said housing, (c) a second pair of juxtaposed rollers and a second shaft supporting the same extending laterally of said housing in a rear portion thereof and said housing having a pair of side openings in either side in which the ends of said second shaft are disposed, said coupler having two slotted side walls through which said second shaft extends which permit limited fore and aft movement of said second shaft relative to said coupler as said coupler telescopes relative to said housing, and said second rollers bearing on the underside of said top wall of said coupler, said top wall of said coupler conforming to said right-rectangular interior shape of said housing, and (d) hydraulic means and a line connecting said hydraulic means to said brakes, said hydraulic means applying hydraulic pressure to said brakes when said housing telescopes forwardly relative to said coupler and said hydraulic means releasing hydraulic pressure from said brakes when said housing telescopes rearwardly relative to said coupler.

2. The actuator/coupler of claim 1 in which said hydraulic means includes a hydraulic cylinder block inside said coupler, said block having a bore therethrough in which said second shaft is positioned, said bore being counterbored at each end and said second rollers having axial openings and having annular extensions therearound fitting into said counterbores and orienting said second rollers during insertion of said second shaft in said openings in said second rollers during assembly of said actuator/coupler.

3. The actuator/coupler of claim 1 in which said first rollers have axial openings and there is a support member below each of said first rollers wherein said first rollers rest on upper surfaces of said support members supporting said first rollers during insertion of said first shaft in said openings in said first rollers during assembly of said actuator/coupler.

4. The actuator/coupler of claim 3 in which said support members are upwardly concave and have the shapes of arcs of circles when viewed from the sides thereof.

5. An actuator/coupler for a trailer having a forward coupler to receive a ball of a towing vehicle and a rear housing to attach to a tongue of said trailer, said trailer having hydraulically actuated brakes, the improvement, comprising:
(a) said coupler having generally a right-rectangular exterior shape and said housing having a hollow interior of right-rectangular shape generally fitting the shape of said coupler which has a telescoping relationship thereto, said housing having an exterior of generally right-rectangular shape,
(b) said coupler having a first pair of juxtaposed rollers in an upper portion of said coupler and said housing having an interior top wall and said rollers bearing on the underside of said top wall of said housing, said coupler having a pair of side openings and a first shaft supporting said rollers and extending laterally of said coupler and through said pair of side openings and said rollers being rotatably supported by said shaft, said housing having slots through which said first shaft extends which permit limited fore and aft movement of said shaft relative to said housing as said coupler telescopes relative to said housing,
(c) a second pair of juxtaposed rollers and a second shaft supporting the same extending laterally of said housing in a rear portion thereof and said housing having a pair side openings in which the ends of said second shaft are disposed, said coupler having two slotted side walls through which said second shaft extends which permit limited fore and aft movement of said second shaft relative to said coupler as said coupler telescopes relative to said housing, and said second rollers bearing on the underside of said top wall of said coupler, said top wall of said coupler conforming to said right-rectangular interior shape of said housing,
(d) hydraulic means including a hydraulic cylinder and a line connecting said hydraulic cylinder to said brakes, said hydraulic means applying hydraulic pressure to said brakes when said housing telescopes forwardly relative to said coupler and said hydraulic means releasing hydraulic pressure from said brakes when said housing telescopes rearwardly relative to said coupler, and
(e) a shock absorber and said hydraulic cylinder and said shock absorber being contained within said coupler and being attached thereto, and said coupler being operative, upon removal of said shafts, to being withdrawn in one piece together with said shock absorber and said hydraulic cylinder, upon disconnection of said line from said cylinder, for maintenance, repair and replacement of said coupler.

* * * * *